Figure 1:
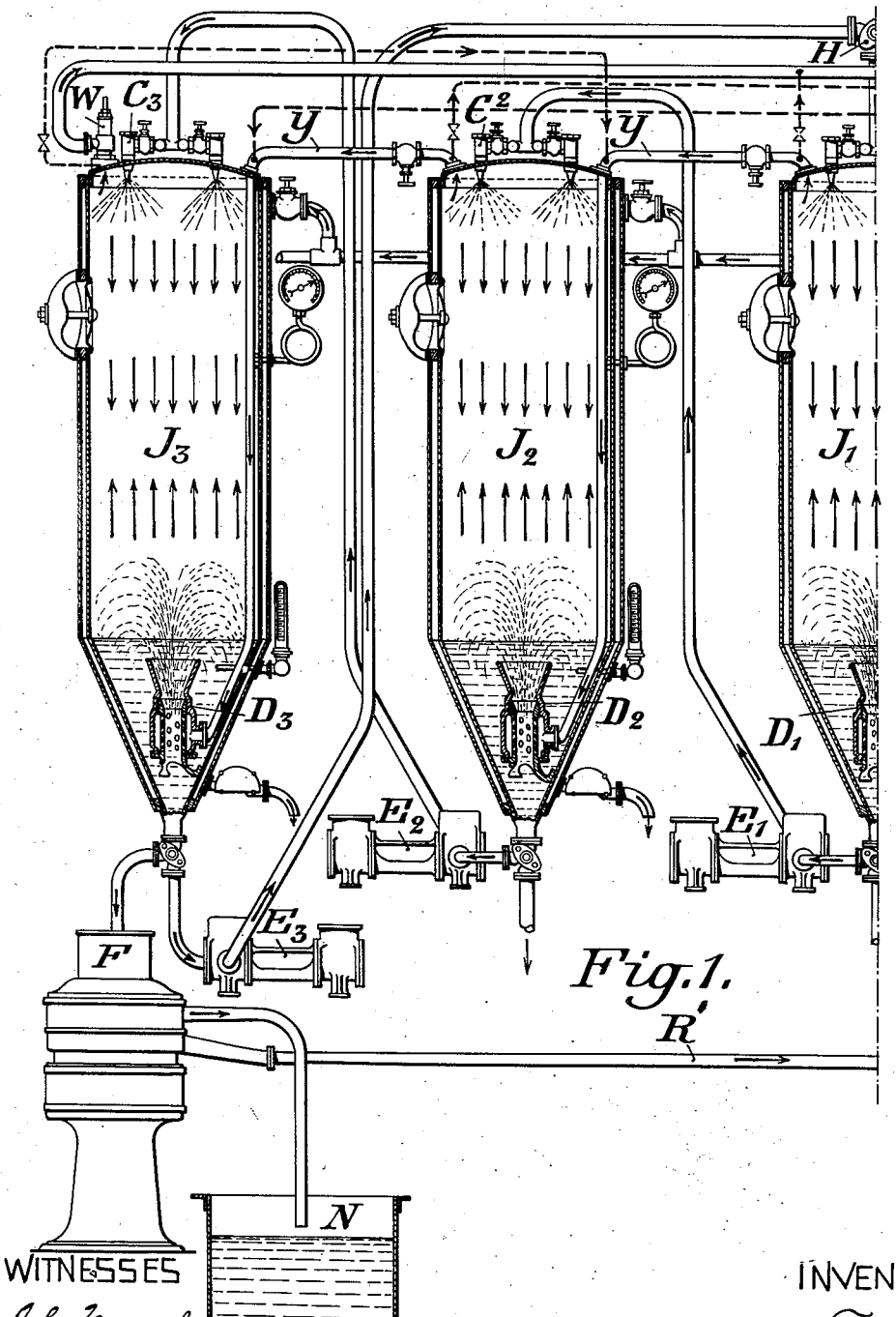

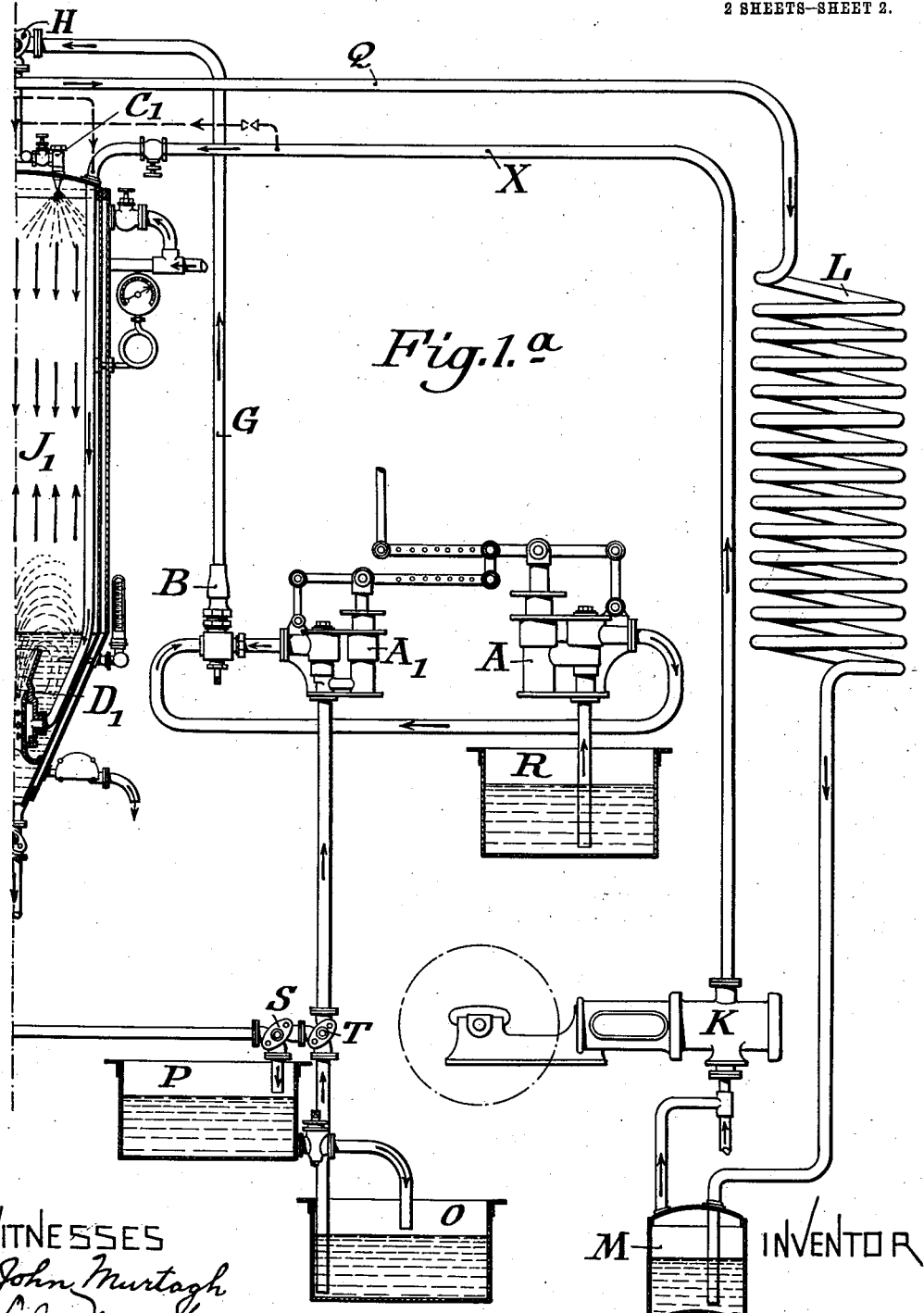
Fig. 1.ᵃ

UNITED STATES PATENT OFFICE.

MOSE WILBUSCHEWITSCH, OF NISCHNINOVGOROD, KANAVINO, RUSSIA.

PROCESS FOR CONVERTING FATS, OILS, AND FISH-OILS INTO LIKE BODIES OF HIGHER MELTING-POINT.

1,024,758.   Specification of Letters Patent.   Patented Apr. 30, 1912.

Application filed January 12, 1911. Serial No. 602,322.

*To all whom it may concern:*

Be it known that I, MOSE WILBUSCHEWITSCH, factory directory, a subject of the Russian Emperor, and resident of Nischninovgorod, Kanavino, Russia, have invented certain new and useful Improvements in Processes for Converting Fats, Oils, and Fish-Oils into Like Bodies of Higher Melting-Point; and I do hereby declare the following to be a full, clear, and exact description of the invention, such as will enable others skilled in the art to which it appertains to make and use the same.

Processes and apparatus are known for converting fatty acids and fats into like bodies of higher melting point by the contact method. Such processes, however, have proved suitable only for fatty acids. They are not applicable to fats principally because of the high temperatures which they use. One of the processes operates at 250–270° centigrade; another at 160–200° C. At these relatively high temperatures in particular if the fat comes in contact with the hot contact substance in a very thin layer it undergoes decomposition and other changes which militate against the use of the process.

The present invention relates to a process of cheaply and simply converting fats, oils, fish oils and the like into fats of higher melting point, that is to say a process for obtaining fats and oils of comparatively high value from the cheaper kinds, and consists in mixing the fat or oil with the catalyst very intimately and directing against this mixture in a very finely subdivided state in an autoclave under pressure, hydrogen or a gas containing hydrogen. Since in this manner a remarkably intimate contact of the hydrogen with the finely subdivided intimate mixture of fat and catalyst is attained a comparatively low temperature suffices for the conversion of the fat. The process proceeds in a closed cycle of operations as the catalyst and the hydrogen which is not consumed are continuously returned to the process.

In the accompanying drawings suitable apparatus for carrying out the process is shown by way of example.

Figures 1 and 1ª are together a section through the whole apparatus.

The process is as follows: The fat to be treated is introduced into the vessel R and the catalyst which is a fluid resembling emulsion is introduced into the vessel O. The oil and the catalyst are fed by differentially connected pumps A, A' into the mixing device B. Here there is produced an intimate mixture of the oil and the catalyst in the manner described hereinafter. The mixture then passes through a pipe G and a valve H into the autoclave J' which has a double heating jacket and is preferably conically shaped at its lower part. At its upper part the autoclave is provided at the place of admission of the mixture with spraying devices C'. The spraying device preferably consists of a system of spraying nozzles which are so arranged that the oil and catalyst are uniformly scattered in finely sub-divided condition throughout the whole inner space of the autoclave. The spraying nozzles are preferably interchangeable for the purpose of facilitating cleaning of them. The hydrogen serving for the reduction is introduced into the autoclave from compressor K through the pipe X from which it enters the autoclave at D' under a pressure of about 9 atmospheres. The admission nozzle D' for the hydrogen is preferably of the kind described in German Patent No. 228128. By this arrangement an extremely intimate contact and an emulsification of the oil mixture with the hydrogen is achieved on the countercurrent and continuous current principle. The autoclave is heated to between 100–160° centigrade according to the nature of the oil under treatment. The reduction by the hydrogen begins at the upper part of the autoclave. The partially reduced oil mixture collects in the conical part of the autoclave and is sprayed in the form of a fountain through the autoclave by the incoming hydrogen whereby the reduction is accelerated. The mixture is then pumped by pump E' into the second autoclave J². The hydrogen enters this autoclave through pipe Y and the action of the first autoclave is repeated. Any number of such autoclaves can be arranged in series or in parallel to each other according to the extent of reduction required. It is generally suitable to use one autoclave for each increase of melting point by 15° C. When the oil has attained the desired melting point which is ascertained by samples withdrawn from the autoclaves, the oil mixture is withdrawn through the valve U into the centrifugal apparatus F. The centrifugal action in this last named apparatus, separates the oil from the catalyst. The finished reduced oil flows into the reservoir N while the catalyst is returned to the process through the pipe R' and valves S and T. At first when the catalyst is still quite fresh only a little of it is necessary, 1% may be advantageously used. When, however, in the course of the process its catalytic power decreases correspondingly more of it must be used. The regulation of the quantity of catalyst may be attained by a suitable adjustment of the differential pump system. When the catalyst is completely used up it is allowed to flow out through the valve S into the reservoir P in order to be regenerated. The working is continued by introduction of fresh catalyst through the valve T. The hydrogen not consumed escapes through the non-return valve W and pipe Q and cooling worm L into a vessel M filled with caustic soda lye where it is purified and whence it passes back to the process.

The apparatus can be worked either continuously or intermittently accordingly as the valves H and U are adjusted. Moreover, either all the autoclaves may be connected in series or there may be used only a single autoclave for the process. In the latter case, however, a correspondingly longer time is necessary for completing the process.

The process can be carried out in manner the reverse to that already described, that is to say the first treatment may occur in the last autoclave; for instance at a pressure of 9 atmospheres and the pressure may be diminished in the succeeding autoclaves with aid of a reducing valve so that in the last there is not more than about 1 atmosphere pressure. The hydrogen is then conducted as shown by the dotted lines in Fig. 1.

Instead of a centrifugal apparatus filter presses may be used, two being advantageous. These presses should be provided with heating devices.

All the apparatus with which the oil comes in contact are well insulated.

If the temperature is too high in the autoclave cold water is introduced into the heating jacket until the desired temperature is again attained.

The process and apparatus may be used for all unsaturated acids and their glycerids, as well as for waxes and other alcoholic fatty substances. The process yields neutral clear fats, for instance from castor oil there is obtained a product which melts at 83° C. Products made according to the invention can be used for all technical purposes, for instance for making soaps which do not dissolve so quickly in hot water as ordinary soaps do. The finished product can be hydrolized and the fatty acids distilled. For example from cotton seed oil there may be obtained fatty acids which melt up to 71° C. and make excellent candles.

After suitable refining the products may yield satisfactory alimentary fats if the reduction is only carried so far that the melting point is between 28 and 34° C. Thus from castor oil there may be made a product which is odorless and tasteless but retains the other properties of castor oil. So also from cod liver oil and other fish oils there may be made butter substitutes, or from vegetable oils substitutes for cocoa butter. Oils treated by the process lose their specific odor. The iodin number of the materials treated by the process can be lowered to zero.

The apparatus is also suitable for making blown oils, for example marine oil and oxidized linseed oil; for the manufacture of varnishes and linoleum. In such cases oxygen, air, ozone or another oxidizing gas is substituted for the hydrogen and the contact substance may be omitted.

Having now particularly described and ascertained the nature of my said invention and in what manner the same is to be performed, I declare that what I claim is:—

1. A process for converting fats, oils or fish oils into like bodies of higher melting point, which process consists in first intimately mixing the fat with the catalyst and then injecting the mixture in finely sprayed condition into a heated autoclave under pressure and at the same time hydrogen under pressure into the autoclave in the direction opposed to that of the said mixture.

2. A process for converting fats, oils or fish oils into like bodies of higher melting point, which process consists in first intimately mixing the fat with the catalyst, then injecting the mixture in a finely sprayed condition into a heated autoclave and at the same time introducing into the autoclave a current of hydrogen under pressure in the direction opposite to that of the said mixture, the said current of hydrogen being adapted to spray like a fountain into the autoclave the mixture falling to the bottom thereof, then pumping the mixture if necessary into further autoclaves in which it is subjected to the like treatment until the desired melting point has been attained and then separating the oil from the catalyst and then returning the catalyst to the process and at the same time causing the hydrogen to pass through the purifying apparatus to return to the process.

3. A process for converting fats, oils or fish oils into like bodies of higher melting point, which process consists in first intimately mixing the fat with the catalyst, then injecting the mixture in a finely sprayed condition into a heated autoclave under pressure, which autoclave is the last of the series, and at the same time introducing into the autoclave a current of hydrogen under pressure in the direction opposite to that of the mixture, then pumping the mixture from the said autoclave into the next autoclave and allowing the hydrogen under pressure in the said last autoclave to enter the said next autoclave under an increased pressure.

In testimony, that I claim the foregoing as my invention, I have signed my name in presence of two subscribing witnesses.

MOSE WILBUSCHEWITSCH.

Witnesses:
    HENRY HASPER,
    WOLDEMAR HAUPT.